(12) United States Patent
Shirai et al.

(10) Patent No.: US 7,843,388 B2
(45) Date of Patent: Nov. 30, 2010

(54) ARRIVAL DIRECTION ESTIMATION APPARATUS

(75) Inventors: Hideki Shirai, Tokyo (JP); Chiharu Yamano, Tokyo (JP); Kazuma Natsume, Kariya (JP); Yasuyuki Miyake, Kariya (JP)

(73) Assignee: Denso Corporation, Aichi (JP)

( * ) Notice: Subject to any disclaimer, the term of this patent is extended or adjusted under 35 U.S.C. 154(b) by 984 days.

(21) Appl. No.: 11/645,754

(22) Filed: Dec. 27, 2006

(65) Prior Publication Data

US 2007/0147482 A1 Jun. 28, 2007

(30) Foreign Application Priority Data

Dec. 28, 2005 (JP) ............................. 2005-379533

(51) Int. Cl.
*G01S 5/04* (2006.01)
*H04B 7/216* (2006.01)

(52) U.S. Cl. ....................... 342/432; 370/335

(58) Field of Classification Search ................. 342/432; 370/335

See application file for complete search history.

(56) References Cited

U.S. PATENT DOCUMENTS

2003/0210670 A1* 11/2003 kisigami et al. ............. 370/335

FOREIGN PATENT DOCUMENTS

| JP | 10-142308 | 5/1998 |
|---|---|---|
| JP | 11-044748 | 2/1999 |
| JP | 11-231033 | 8/1999 |
| JP | 11-344517 | 12/1999 |
| JP | 2000-338215 | 8/2000 |
| JP | 2001-305202 | 10/2001 |
| JP | 2002-243826 | 8/2002 |
| JP | 2004-007338 | 1/2004 |
| JP | 2005-201798 | 7/2005 |

OTHER PUBLICATIONS

"Adaptive signal processing by array antenna," Nobuyoshi Kikuma, Science technology Co., 1998.
"Multiple Emitter Location and Signal Parameter Estimation," R. O. Schmidt, IEEE Trans., AP-34, pp. 276-280 (1986).

* cited by examiner

*Primary Examiner*—Thomas H Tarcza
*Assistant Examiner*—Harry Liu
(74) *Attorney, Agent, or Firm*—Louis Woo

(57) ABSTRACT

A technology for providing an arrival direction estimation apparatus which can greatly reduce the calculation amount in spectrum calculation and can perform precise direction estimation without setting short frequency division in spectrum calculation is disclosed. According to the technology, there is provided the arrival direction estimation apparatus including an antenna, a complex digital signal converting means, a real number correlation matrix calculating means, a real number weight matrix calculating means, a spectrum calculating means, and a spectrum peak detecting means, wherein the spectrum calculating means has a real number matrix storing means which stores a real number matrix, a multiplying means which multiplies part of elements of the real number matrix by part of elements of a real number weight matrix, a result storing means which stores the multiplication processing result, a calculating means which performs at least one or more processing of matrix element inversion processing and matrix element sign change processing for the stored processing result, an adding means which adds the processing result by the calculating means, part of the processing result stored in the result storing means, and part of the elements of the real number weight matrix, and a spectrum calculating means which calculates a spectrum with the use of the processing result.

8 Claims, 13 Drawing Sheets

ELEMENT D11

ELEMENT D12

ELEMENT D13

ELEMENT D21

ELEMENT D22

ELEMENT D23

ARRIVAL DIRECTION ESTIMATION APPARATUS

BACKGROUND OF THE INVENTION

1. Field of the Invention

The present invention relates to an arrival direction estimation apparatus for estimating the arrival direction of electric waves and sound waves by using an antenna composed of a plurality of antenna elements.

2. Description of the Related Art

There have historically been a number of methods of estimating the arrival direction of, for example, electric waves and sound waves by using an array antenna composed of a plurality of antenna elements. The simplest method thereof is beam former method using the same principle as that of Fourier transform. As a method having a higher direction resolution, CAPON method, MUSIC (MUltiple SIgnal Classification) method based on null scanning and the like can be cited. These methods are disclosed in the following nonpatent document 1 and nonpatent document 2. A description will be hereinafter given of the arrival direction estimation taking existing MUSIC method as an example. The structure of an existing arrival direction estimation apparatus will be described by using FIG. 12. As shown in FIG. 12, signals received by a plurality of antenna elements 1201-1 to 1201-K are converted to complex digital signals by signal obtaining means 1202-1 to 1202-K of a complex digital signal obtaining means 1202. Next, a complex correlation matrix calculating means 1203 calculates a complex correlation matrix Rxx by performing correlation calculation among the plurality of antenna elements of the converted complex digital signals. When the antenna elements are arranged symmetrically, a real number correlation matrix Ryy is obtained by using unitary method. When the real number correlation matrix Ryy is used instead of Rxx, a subsequent eigen value decomposition calculation amount can be greatly reduced. The details of unitary method are disclosed in nonpatent document 1 and patent document 1.

The obtained complex correlation matrix Rxx (or real number correlation matrix Ryy) is inputted to a weight matrix calculating means 1204. In the case of MUSIC method, the correlation matrix is provided with eigen value decomposition, and a signal eigen space matrix Es=[e(1) . . . e(L)] (K*L matrix) and a noise eigen space matrix EN=[e(L+1) . . . e(K)] (K*(K−L) matrix) are calculated. L is the signal dimension number (the number of arrival waves). The obtained weight matrix w(in the case of MUSIC, w is a noise eigen space matrix $E_N$) is inputted to a spectrum calculating means 1205, where a spectrum is calculated. A pseudo spectrum in a direction θ in MUSIC method when Rxx is used as a correlation matrix is obtained by formula 16. a(θ) is a complex steering vector (size K) in the direction θ. Superscript H means conjugate transposition.

$$SPE_{MUSIC}(\theta) = \frac{1}{a(\theta)^H E_N E_N^H a(\theta)} \quad (16)$$

When θ is equal to the actual arrival direction, SPE (θ) becomes the infinite value. Therefore, a direction θ having a peak value in the calculation result of SPE becomes an estimated value of the arrival wave direction. Meanwhile, a pseudo spectrum in the direction θ when Ryy is used as a correlation matrix is obtained by formula 17. d(θ) is a real number steering vector sized K. $Q_K$ is a unitary matrix sized K*K (refer to nonpatent document 1). Superscript T means transposition.

$$SPE_{UMUSIC}(\theta) = \frac{1}{d(\theta)^T E_N E_N^T d(\theta)} \quad (17)$$

where $d(\theta) = Q_K^T a(\theta)$

As described above, to obtain the arrival direction, it is firstly necessary to calculate the spectrum over the all directions θ desired to be observed. After that, estimation is made so that the direction corresponding to a peak value of the spectrum is the estimated arrival direction. In the processing for estimating the arrival direction, the spectrum calculation amount is generally large. Therefore, in the past, several methods to reduce the spectrum calculation amount have been proposed. The following patent document 2 discloses a method of calculating the spectrum $SPE_{MUSIC}$ of the foregoing formula 16 by using FFT (Fast Fourier Transform). However, the method is not able to be used for calculating the spectrum $SPE_{UMUSIC}$ of the foregoing formula 17. Further, The following patent document 3 discloses a method in which the arrival direction is obtained with a low degree of precision by beam former method with the less calculation amount, and then the MUSIC spectrum is calculated only for the periphery thereof. In this case, it is necessary to calculate the spectrum by a plurality of methods, generally leading to complex processing. Further, the following patent document 4 discloses a method as follows. The method is used in the case that the antenna elements composing the array antenna are linearly arranged at equal intervals. The spectrum result in the positive (or negative) region is converted to the spectrum result in the negative (or positive) region, and thus the calculation amount of the spectrum $SPE_{UMUSIC}$ of the foregoing formula 17 is reduced by half. In this case, the calculation amount is only reduced by about half at maximum. Further, to improve the direction estimation precision, it is necessary to set short frequency division, leading to a further increased calculation amount.

Next, CAPON method will be described with illustration. The procedure until the correlation matrix calculation is similar to that of MUSIC method, and thus the description thereof will be omitted. The CAPON spectrum in the case of using the complex correlation matrix Rxx and the real number correlation matrix Ryy can be obtained by the following formulas 18 and 19 respectively. Superscript −1 represents an inverse matrix.

$$SPE_{CAPON}(\theta) = \frac{1}{a(\theta)^H R_{xx}^{-1} a(\theta)} \quad (18)$$

$$SPE_{UCAPON}(\theta) = \frac{1}{d(\theta)^T R_{yy}^{-1} d(\theta)} \quad (19)$$

As a device to reduce the calculation amount of the CAPON spectrum, the following patent document 4 discloses a method in which the inverse matrix of the correlation matrix is once decomposed into an upper triangular matrix or a lower triangular matrix by using Choleski decomposition, and then the spectrum is calculated. However, in this method, for example, it is not possible to expect effects when the ratio of the Choleski decomposition calculation amount in relation to the whole spectrum calculation amount becomes large, for example, when there are different correlation matrices for each observed distance and the number of calculated direction in each spectrum is small. The flow from after the spectrum calculation the to arrival direction estimation is similar to that of MUSIC method.

Nonpatent document 1: "Adaptive signal processing by array antenna," Nobuyoshi Kikuma, Science technology Co., 1998.

Nonpatent document 2: "Multiple Emitter Location and Signal Parameter Estimation," R. O. Schmidt, IEEE Trans., AP-34, pp. 276-280 (1986).

Patent document 1: Japanese Patent Application Publication No. 11-344517, paragraph 0018 and Abstract.

Patent document 2: Japanese Patent Application Publication No. 2001-305202, paragraph 0033 and Abstract.

Patent document 3: Japanese Patent Application Publication No. 11-231033, paragraph 0019.

Patent document 4: Japanese Patent Application Publication No. 2002-243826, paragraph 0168.

As described above, to obtain the arrival direction, it is firstly necessary to calculate the spectrum over the all directions θ desired to be observed. The calculation amount therein is generally large. In the past, several methods to reduce the calculation amount have been proposed. However, the existing methods hereto proposed have the problems as follows. For example, one of the methods is not able to be applied to the case using unitary method. One of the methods makes the processing complicated. In one of the methods, the reduction effect is not sufficient, and in addition, to improve the direction estimation precision, it is necessary to set the short frequency division, leading to a further increased calculation amount.

SUMMARY OF THE INVENTION

In order to solve the above problems, it is an object of the invention to provide an arrival direction estimation apparatus which can greatly reduce the calculation amount in spectrum calculation and can perform precise direction estimation without setting the short frequency division in spectrum calculation.

To attain the foregoing object, according to an aspect of the invention, there is provided an arrival direction estimation apparatus including an antenna in which a plurality of antenna elements are symmetrically arranged centering on a given reference position or a reference line and which receives signals by the plurality of antenna elements, a complex digital signal converting means which converts the signals received by each antenna element of the antenna to complex digital signals, a real number correlation matrix calculating means which calculates a real number correlation matrix expressing correlation among the plurality of antenna elements of the complex digital signals, a real number weight matrix calculating means which calculates a real number weight matrix used for calculating a spectrum based on the calculated real number correlation matrix, a spectrum calculating means which calculates the spectrum based on the calculated real number weight matrix and a previously prepared real number matrix used for calculating the spectrum, and a spectrum peak detecting means which detects a direction with a peak value with the use of the calculated spectrum, wherein the spectrum calculating means has a real number matrix storing means which stores the real number matrix, a multiplying means which multiplies part of elements of the real number matrix stored in the real number matrix storing means by part of elements of the real number weight matrix, a result storing means which stores a processing result of multiplication by the multiplying means, a calculating means which performs at least one or more processing of matrix element inversion processing and matrix element sign change processing for the processing result stored in the result storing means, an adding means which adds a processing result by the calculating means, part of the processing result stored in the result storing means, and part of the elements of the real number weight matrix, and a spectrum calculating means which calculates the spectrum with the use of a processing result by the adding means. By the foregoing structure, even when Fast Fourier Transform is not able to be applied to spectrum calculation, the calculation amount in spectrum calculation can be greatly reduced.

Further, the arrival direction estimation apparatus according to the aspect of the invention preferably includes an arrival direction calculating means which estimates a more accurate arrival direction of the signals based on spectrum results at the direction detected by the spectrum peak detecting means and at peripheral directions thereof. By the foregoing structure, more accurate direction is estimated by using quadratic function approximation with the use of the spectrum value at the peak direction and at the peripheral directions thereof. Therefore, it is possible to perform more precise direction estimation without setting short frequency division in spectrum calculation.

Further, according to the arrival direction estimation apparatus of the aspect of the invention, it is preferable that the spectrum calculating means includes the real number matrix storing means which stores the real number matrix, the multiplying means which multiplies the part of the elements of the real number matrix stored in the real number matrix storing means by the part of the elements of the real number weight matrix, the result storing means which stores the processing result of multiplication by the multiplying means, the calculating means which performs at least one or more processing of the matrix element inversion processing and the matrix element sign change processing for the processing result stored in the result storing means, the adding means which selectively adds elements from the group including the processing result by the calculating means, the part of the processing result stored in the result storing means, and the part of the elements of the real number weight matrix, and the spectrum calculating means which calculates the spectrum with the use of the processing result by the adding means, and wherein the adding means stores a given processing result by itself in the result storing means. By the foregoing structure, it is possible to reuse the multiplication result and the adding result in spectrum calculation. Therefore, it is possible to reduce the number of multiplication and the number of addition in spectrum calculation.

Further, according to the arrival direction estimation apparatus of the aspect of the invention, it is preferable that the real number matrix storing means stores only the part of the elements of the real number matrix. By the foregoing structure, it is possible to reduce the usage amount of the storage region.

Further, according to the arrival direction estimation apparatus of the foregoing aspect of the invention, it is preferable that the spectrum calculating means calculates the spectrum by using a multiplication result of elements of the vectors indicating directivity of the antenna. By the foregoing structure, the spectrum calculation amount can be greatly reduced.

According to another aspect of the invention, there is provided an arrival direction estimation apparatus including an antenna in which a plurality of antenna elements are arranged and which receives signals by the plurality of antenna elements, a complex digital signal converting means which converts the signals received by each antenna element of the antenna to complex digital signals, a correlation matrix calculating means which calculates a correlation matrix expressing correlation among the plurality of antenna elements of the complex digital signals, a weight matrix calculating means which calculates a weight matrix used for calculating a spectrum based on the calculated correlation matrix, a spectrum calculating means which calculates the spectrum based on the calculated weight matrix and a vector indicating directivity of the antenna, a spectrum peak detecting means which detects a direction with a peak value with the use of the calculated spectrum result, and an arrival direction calculating means which estimates an arrival direction of the signals based on spectrum results in the direction detected by the spectrum peak detecting means and peripheral directions thereof. By the foregoing structure, more accurate direction is estimated by using quadratic function approximation with the use of the spectrum peak direction and the peripheral directions thereof. Therefore, it is possible to perform precise direction estimation without setting short frequency division in spectrum calculation.

According to still another aspect of the invention, there is provided an arrival direction estimation apparatus including an antenna in which a plurality of antenna elements are symmetrically arranged centering on a given reference position or a reference line and which receives signals by the plurality of antenna elements, a complex digital signal converting means which converts the signals received by each antenna element of the antenna to complex digital signals, a real number correlation matrix calculating means which calculates a real number correlation matrix expressing correlation among the plurality of antenna elements of the complex digital signals, a real number weight matrix calculating means which calculates a real number weight matrix used for calculating a spectrum based on the calculated real number correlation matrix, an inverse unitary converting means which provides the calculated real number weight matrix with inverse unitary conversion to calculate a complex weight matrix, a spectrum calculating means which provides the calculated complex weight matrix with Fast Fourier Transform to calculate the spectrum, a spectrum peak detecting means which detects a direction with a peak value with the use of the calculated spectrum result, and an arrival direction calculating means which estimates an arrival direction of the signals based on spectrum results in the direction detected by the spectrum peak detecting means and peripheral directions thereof. By the structure, the real number weight matrix used for spectrum calculation is returned to the complex numbers to use Fast Fourier Transform. Therefore, even when Fast Fourier Transform is not able to be applied to spectrum calculation, the spectrum calculation amount can be greatly reduced.

Further, according to the arrival direction estimation apparatus of the foregoing aspect of the invention, it is preferable that the spectrum calculating means calculates the spectrum by using a multiplication result of elements of the vectors indicating directivity of the antenna. By the foregoing structure, the spectrum calculation amount can be greatly reduced.

The arrival direction estimation apparatus of the foregoing aspects of the invention has the foregoing structures. Thereby, the calculation amount in spectrum calculation can be greatly reduced, and precise direction estimation can be made without setting short frequency division in spectrum calculation.

DETAILED DESCRIPTION OF THE PREFERRED EMBODIMENTS

First Embodiment

Figure 1:
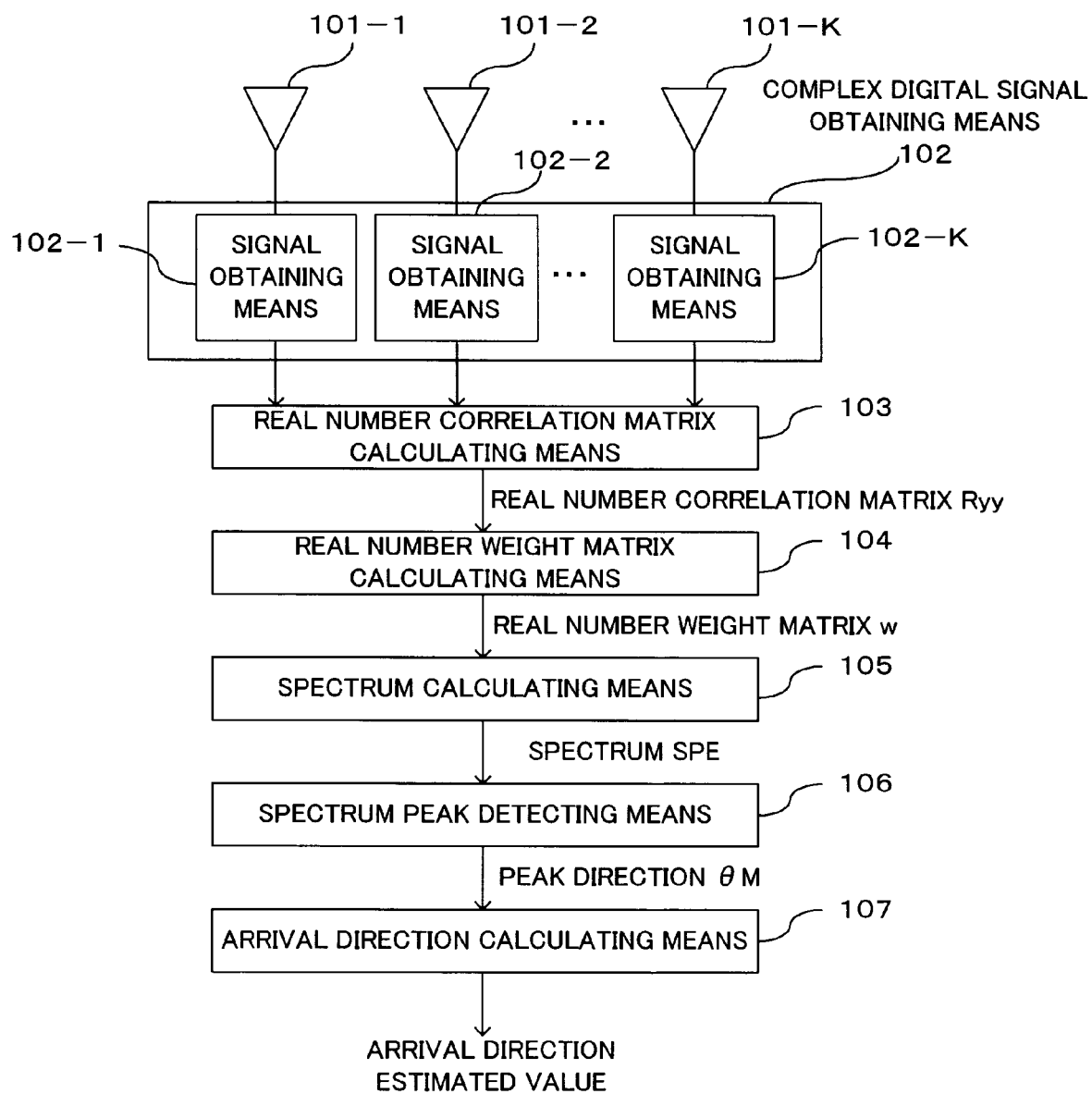
FIG. 1 is a structural diagram showing a structure of an arrival direction estimation apparatus according to a first embodiment of the invention.
Figure 2:
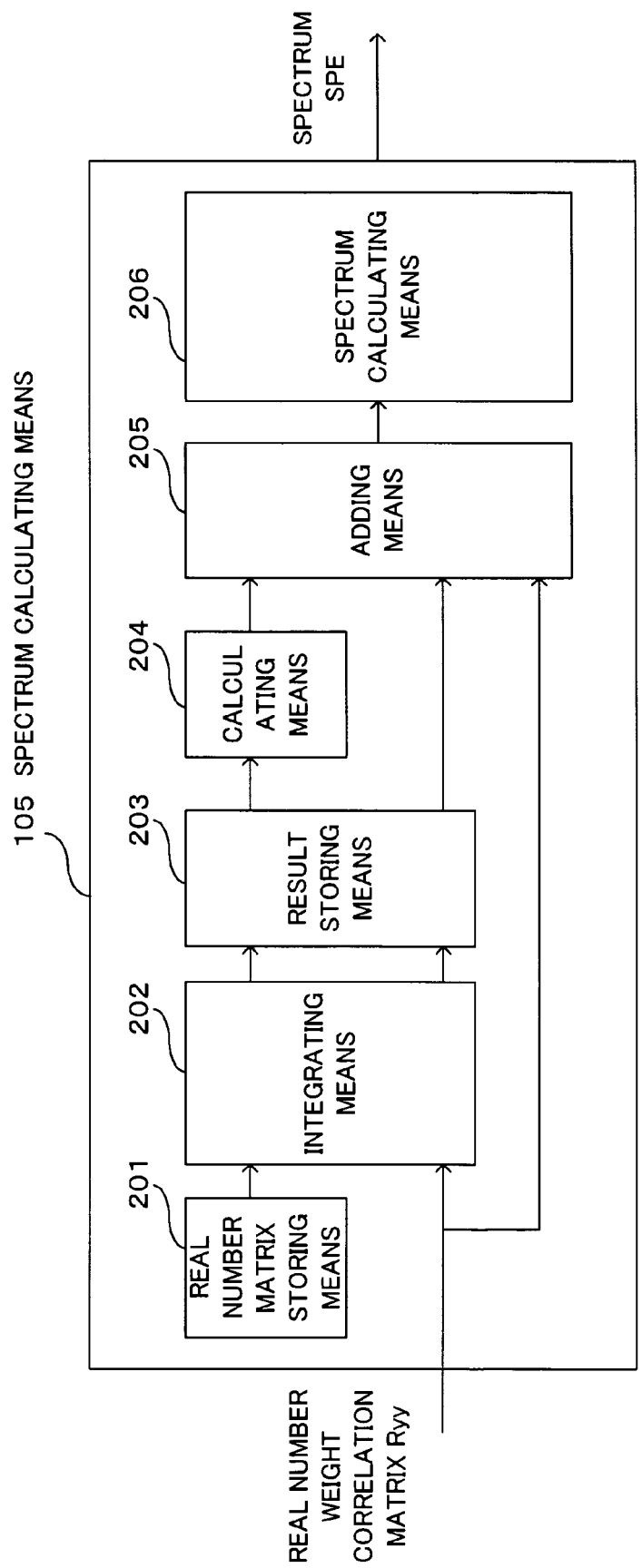
FIG. 2 is a structural diagram showing a structure of a spectrum calculating means of the arrival direction estimation apparatus according to the first embodiment of the invention.
Figure 3:
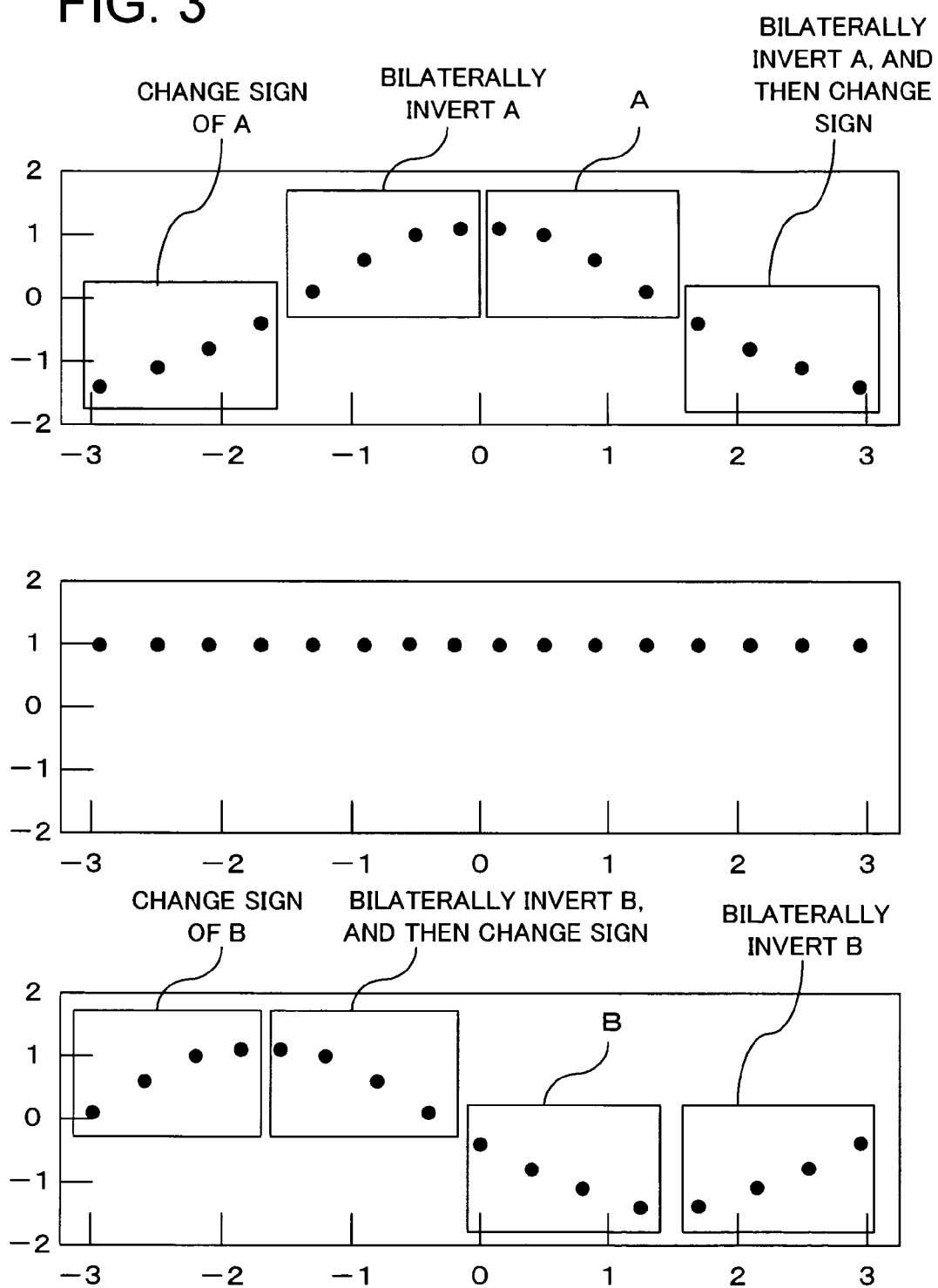
FIG. 3 is a diagram which graphs out coefficient values of each line of a matrix (rDFT) used for spectrum calculation of the arrival direction estimation apparatus according to the first embodiment of the invention.
Figure 4:
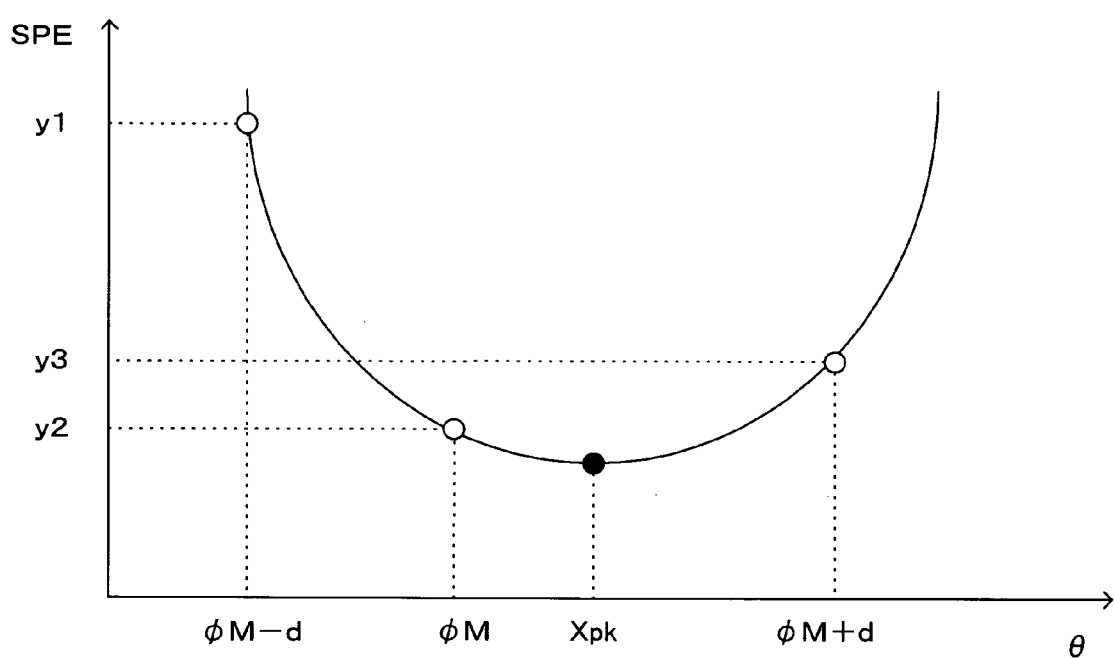
FIG. 4 is a diagram for explaining direction estimation using quadratic function approximation of a spectrum in the arrival direction estimation apparatus according to the first embodiment of the invention.
Figure 5:
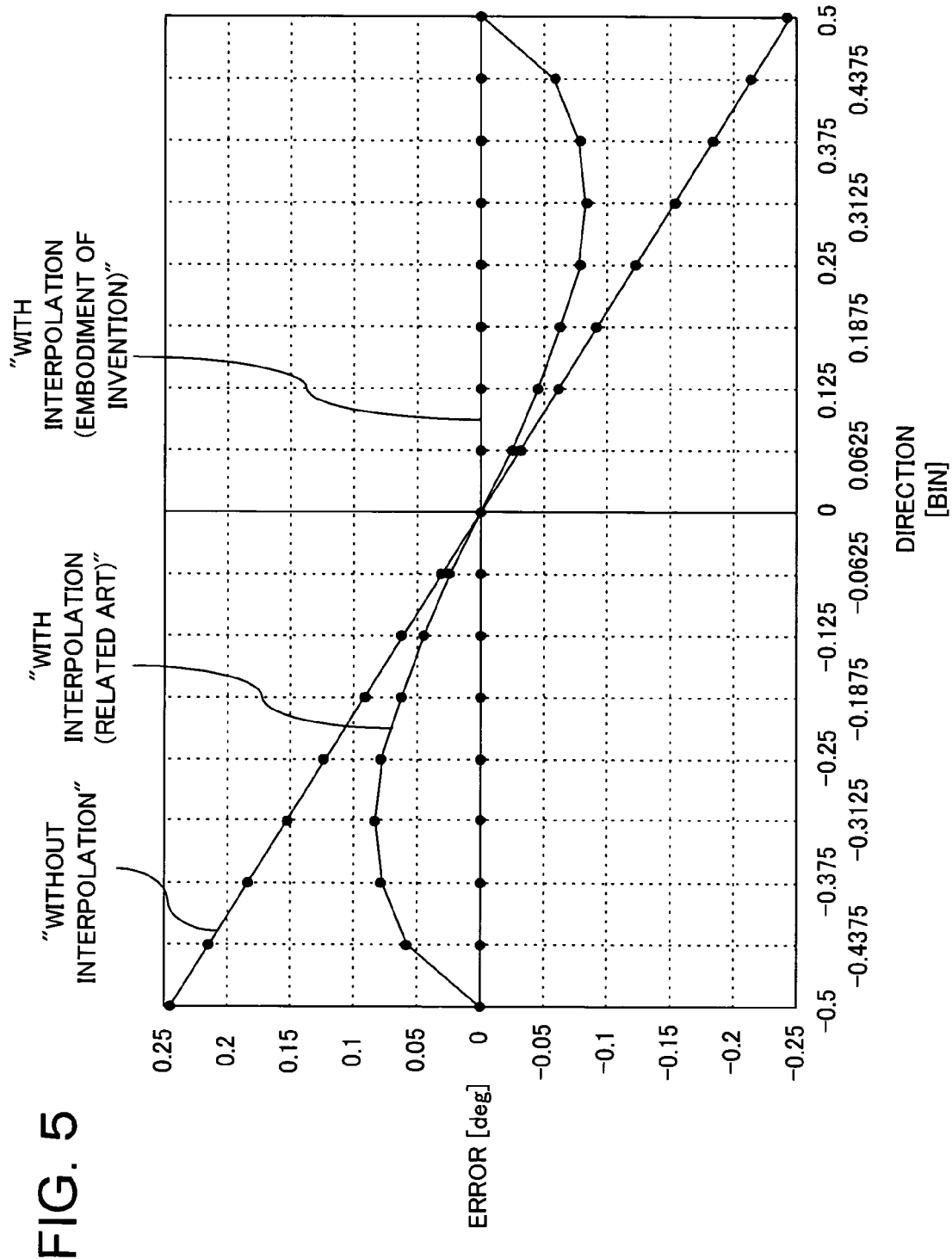
FIG. 5 is a diagram showing direction estimation errors in the case using the quadratic function approximation of the spectrum in the arrival direction estimation apparatus according to the first embodiment of the invention and in the case not using it.
Figure 6:
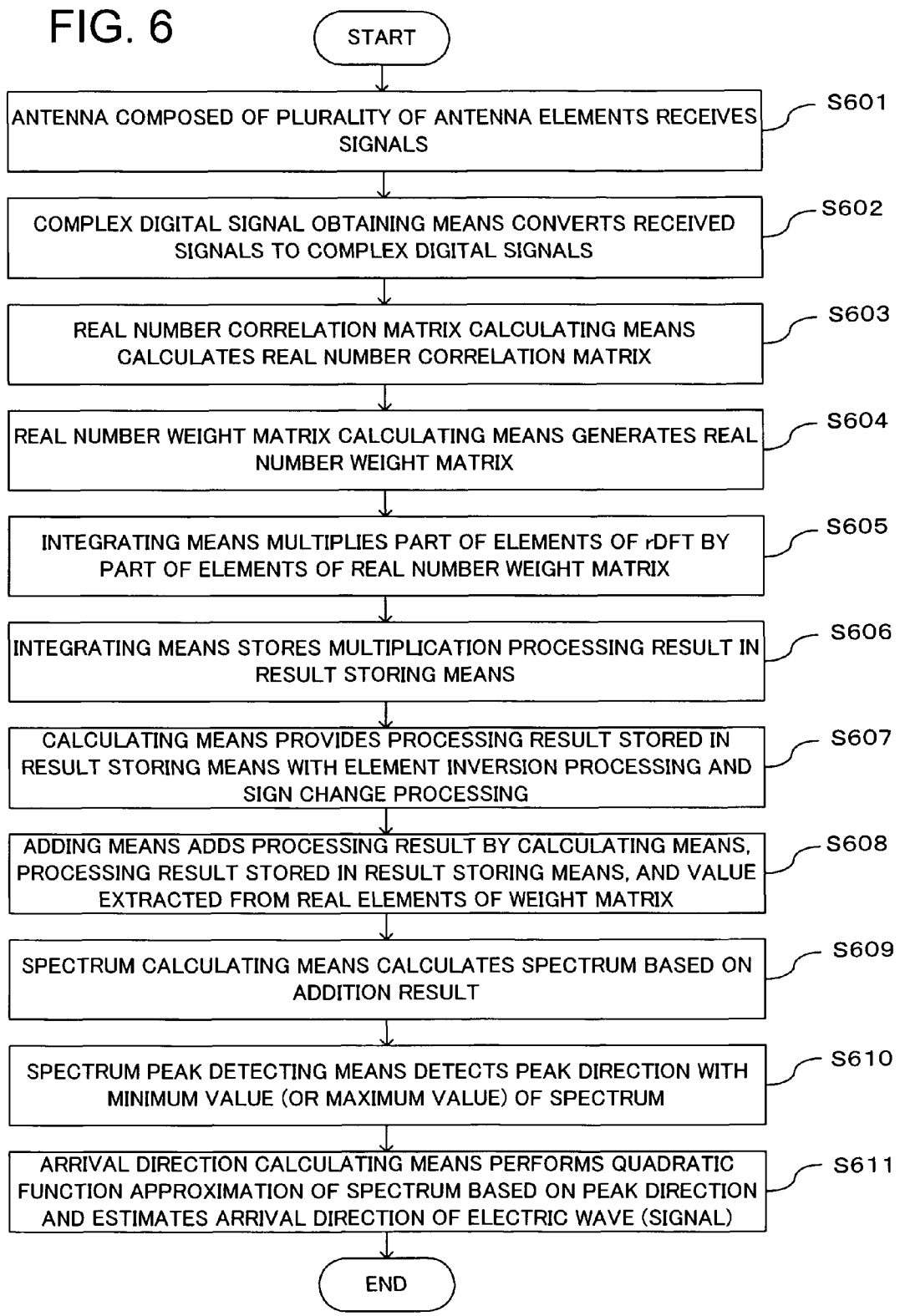
FIG. 6 is a flowchart for explaining an arrival direction estimation flow in the arrival direction estimation apparatus according to the first embodiment of the invention.

A description will be hereinafter given of an arrival direction estimation apparatus according to a first embodiment of the invention with reference to FIG. 1 to FIG. 6. FIG. 1 is a structural diagram showing a structure of the arrival direction estimation apparatus according to the first embodiment of the invention. FIG. 2 is a structural diagram showing a structure of a spectrum calculating means of the arrival direction estimation apparatus according to the first embodiment of the invention. FIG. 3 is a diagram which graphs out coefficient values of each line of a matrix (rDFT) used for spectrum calculation of the arrival direction estimation apparatus according to the first embodiment of the invention. FIG. 4 is a diagram for explaining direction estimation using quadratic function approximation of the spectrum in the arrival direction estimation apparatus according to the first embodiment of the invention. FIG. 5 is a diagram showing a direction estimation errors in the case using the quadratic function approximation of the spectrum in the arrival direction estimation apparatus according to the first embodiment of the invention and in the case not using it. FIG. 6 is a flowchart for explaining an arrival direction estimation flow in the arrival direction estimation apparatus according to the first embodiment of the invention.

First, a description will be given of the structure of the arrival direction estimation apparatus according to the first embodiment of the invention with reference to FIG. 1. As shown in FIG. 1, the arrival direction estimation apparatus includes an antenna 101 composed of a plurality of antenna elements 101-1 to 101-K, a complex digital signal obtaining means 102 composed of a plurality of signal obtaining means 102-1 to 102-K, a real number correlation matrix calculating means 103, a real number weight matrix calculating means 104, a spectrum calculating means 105, a spectrum peak detecting means 106, and an arrival direction calculating means 107. K represents the number of the antenna elements and the number of the signal obtaining means.

The plurality of antenna elements 101-1 to 101-K composing the antenna 101 are arranged symmetrically centering on a given reference position or a reference line. The antenna 101 is, for example, an array antenna. The arrangement of the array antenna is not limited to the arrangement in which the antenna elements are linearly arranged as shown in FIG. 1. Signals received by the antenna elements 101-1 to 101-K are converted to complex digital signals by the signal obtaining means 102-1 to 102-K of the complex digital signal obtaining means 102. The converted complex digital signals are inputted to the real number correlation matrix calculating means 103. The real number correlation matrix calculating means 103 performs correlation calculation among the antenna elements 101-1 to 101-K to calculate a correlation matrix. In this case, a real number correlation matrix Ryy is obtained with the use of unitary method by using the symmetry of the antenna elements 101-1 to 101-K. The method of calculating the correlation matrix is similar to that of the existing arts, and thus the description thereof will be omitted.

The obtained real number correlation matrix Ryy is inputted to the real number weight matrix calculating means 104. The real number weight matrix calculating means 104 generates a real number weight matrix w necessary for spectrum calculation described later. As an example of the real number weight matrix w, a noise space eigen matrix in MUSIC method, an eigen vector corresponding to the minimum eigen value in minimum norm method, a correlation matrix in beam former method, an inverse matrix of a correlation matrix in CAPON method and the like can be cited. A method to derive the real number weight matrix w is well known in the art and is disclosed in the foregoing nonpatent document 1, patent document 4 and the like, and thus the description thereof will be omitted. A description will be hereinafter given of the subsequent processing on the assumption that the real number weight matrix w sized K*1 is obtained. When the size of the real number weight matrix is different, a similar method can be applied. The real number weight matrix w is expressed as shown in the following formula 1. T means transposition.

$$W = [w_1 \ldots w_k]^T \quad (1)$$

The generated real number weight matrix w is inputted to the spectrum calculating means 105. The structure of the spectrum calculating means 105 will be hereinafter described by using FIG. 2. The spectrum calculating means 105 includes a real number matrix storing means 201, a multiplying means 202, a result storing means 203, a calculation means 204, an adding means 205, and a spectrum calculating means 206. The real number matrix storing means 201 stores a real number DFT matrix (hereinafter referred to as rDFT)

used for spectrum calculation. rDFT is expressed as shown in the following formula 2, for example, when the number of array elements is K and the array element positions are arranged linearly at equal intervals.

$$rDFT = [\, d(\phi_1) d(\phi_2) \, \ldots \, d(\phi_{Nfft})] \quad (2)$$

$$d(\phi_i) = \begin{bmatrix} \cos\left(\frac{K-1}{2}\phi_i\right) \\ \vdots \\ \cos(\phi_i) \\ 1 \\ -\sin\left(\frac{K-1}{2}\phi_i\right) \\ \vdots \\ -\sin(\phi_i) \end{bmatrix} \quad (K: \text{odd number})$$

$$d(\phi_i) = \begin{bmatrix} \cos\left(\frac{K-1}{2}\phi_i\right) \\ \vdots \\ \cos\left(\frac{1}{2}\phi_i\right) \\ -\sin\left(\frac{K-1}{2}\phi_i\right) \\ \vdots \\ -\sin\left(\frac{1}{2}\phi_i\right) \end{bmatrix} \quad (K: \text{even number})$$

rDFT is a real number matrix sized K*Nfft. Nfft is the frequency division number. $d(\psi_i)$ is a real number steering vector (size: K*1) in direction $\psi_i$, and the same as $d(\theta)$ in formula 17 described in Description of the Related Art. $\psi = [\psi_1, \psi_2 \ldots \psi_{Nfft}]^T$ is a frequency for calculating the spectrum. Each line of rDFT is expressed by a cos function, a sin function, or a constant number. A description will be hereinafter given of the case of Nfft=16, K=3, $\psi=(\pi/16)*[-15, -13 \ldots -11 \ldots 13, 15]^T$, but the embodiment is not limited to the case using these values. In a second embodiment described later, a description will be given of the case using these values similarly.

Coefficient values of each line of rDFT are shown in FIG. 3. The top section of the figure shows coefficient values of the first line. The middle section thereof shows coefficient values of the second line. The bottom section thereof shows coefficient values of the third line. It is evident in FIG. 3 that elements of each line of rDFT periodically appear along the direction in which $\psi$ is changed, and all elements can be expressed by a combination of part of the elements A, B, and results from providing such elements with at least one of element inversion and sign change. More specifically, when relations of $\cos(-\psi)=\cos(x\psi)$, $\sin(-\psi)=-\sin(\psi)$, $\cos(-\psi\pm\pi/2)=-\cos(x\psi\pm\pi/2)$, and $\sin(-\psi\pm\pi/2)=\sin(x\psi\pm\pi/2)$ are used, rDFT can be expressed as shown in the following formula 3. U(·) is a function to invert the order of elements of "·", and is more specifically defined as shown in the following formula 4. A, B, and C in formula 3 are respectively expressed as shown in formulas 5, 6, and 7.

$$rDFT = \begin{bmatrix} -A^T & U(A^T) & A^T & -U(A^T) \\ C^T & C^T & C^T & C^T \\ -B^T & -U(B^T) & B^T & U(B^T) \end{bmatrix} \quad (3)$$

$$U([\, x_1 \;\; x_2 \;\; \cdots \;\; x_{N-1} \;\; x_N]) = [x_N \;\; x_{N-1} \;\; \cdots \;\; x_2 \;\; x_1] \quad (4)$$

-continued $$A = \sqrt{2}\left[\cos\left(\frac{\pi}{16}\right) \quad \cos\left(\frac{3\pi}{16}\right) \quad \cos\left(\frac{5\pi}{16}\right) \quad \cos\left(\frac{7\pi}{16}\right)\right]^T \quad (5)$$

$$B = -\sqrt{2}\left[\sin\left(\frac{\pi}{16}\right) \quad \sin\left(\frac{3\pi}{16}\right) \quad \sin\left(\frac{5\pi}{16}\right) \quad \sin\left(\frac{7\pi}{16}\right)\right]^T \quad (6)$$

$$C = [1 \quad 1 \quad 1 \quad 1]^T \quad (7)$$

On the basis of the foregoing, the spectrum is calculated. First, $SPE_{tmp}$ is obtained by multiplying rDFT by the weight matrix with the use of the following formula 8. $SPE_{tmp}$ corresponds to the section of $d(\theta)^T \cdot E_N$ of formula 17 in MUSIC method.

$$SPE_{tmp}(\Phi) = rDFT^T \cdot w \quad (8)$$

$$= \begin{bmatrix} -A & C & -B \\ U(A) & C & -U(B) \\ A & C & B \\ -U(A) & C & U(B) \end{bmatrix} \cdot \begin{bmatrix} w_1 \\ w_2 \\ w_3 \end{bmatrix}$$

$$= \begin{bmatrix} -Aw_1 + Cw_2 - Bw_3 \\ U(A)w_1 + Cw_2 - U(B)w_3 \\ Aw_1 + Cw_2 + Bw_3 \\ -U(A)w_1 + Cw_2 + U(B)w_3 \end{bmatrix}$$

$$= \begin{bmatrix} -(Aw_1) + Cw_2 - Bw_3 \\ U(Aw_1) + Cw_2 - U(Bw_3) \\ Aw_1 + Cw_2 + Bw_3 \\ -U(Aw_1) + Cw_2 + U(Bw_3) \end{bmatrix}$$

$$= \begin{bmatrix} s_1 \\ s_2 \\ s_3 \\ s_4 \end{bmatrix}$$

The real number storing means 201 may store either the foregoing rDFT itself or only the foregoing A and B from the viewpoint of effective use of resources. Then, the multiplying means 202 performs multiplications of $A^*w_1$ and $B^*w_3$ shown in the following formula 9 (8 times in total, not necessary to calculate $C^*w_2$). The results are once stored in the storing means 203.

$$Aw_1 = \sqrt{2}\begin{bmatrix} w_1 \cdot \cos\left(\frac{\pi}{16}\right) \\ w_1 \cdot \cos\left(\frac{3\pi}{16}\right) \\ w_1 \cdot \cos\left(\frac{5\pi}{16}\right) \\ w_1 \cdot \cos\left(\frac{7\pi}{16}\right) \end{bmatrix} \quad (9)$$

$$Cw_2 = \begin{bmatrix} w_2 \\ w_2 \\ w_2 \\ w_2 \end{bmatrix}$$

$$Bw_3 = -\sqrt{2}\begin{bmatrix} w_3 \cdot \sin\left(\frac{\pi}{16}\right) \\ w_3 \cdot \sin\left(\frac{3\pi}{16}\right) \\ w_3 \cdot \sin\left(\frac{5\pi}{16}\right) \\ w_3 \cdot \sin\left(\frac{7\pi}{16}\right) \end{bmatrix}$$

Next, respective elements $s_1$ to $s_4$ of $SPE_{tmp}$ are calculated. When $s_1$ is obtained, $A^*w_1$ and $B^*w_3$ are extracted from the result storing means 203, and then sent to the calculating means 204. The calculating means 204 provides $A^*w_1$ and $B^*w_3$ with sign change processing to obtain $-A^*w_1$ and $-B^*w_3$. Then, $w_{2\,(=C^*w_2)}$ extracted from the weight matrix w, $-A^*w_1$ and $-B^*w_3$ are inputted to the adding means 205. The adding means 205 adds each thereof to each other to obtain $s_1$. $s_2$ is similarly obtained. $A^*w_1$ and $B^*w_3$ are extracted from the result storing means 203, and then sent to the calculating means 204. For $A^*w_1$, the calculating means 204 performs element inversion to obtain $U(A^*w_1)$. For $B^*w_3$, the calculating means 204 performs element inversion and then provides sign change processing to obtain $-U(B^*w_3)$. Then, $w_2$ extracted from the weight matrix, $U(A^*w_1)$, and $-U(B^*w_3)$ are inputted to the adding means 205. The adding means 205 adds each thereof to each other to obtain $s_2$. As above, by using the symmetry and the periodicity of the matrix elements of rDFT, the matrix calculation amount can be smaller than that of a usual matrix calculation amount, leading to reduction of the spectrum calculation amount. $s_3$ and $s_4$ can be obtained by similar processing. In the case of the foregoing example, the number of multiplications is reduced from 48 times to sixth part thereof, that is, 8 times.

As described above, calculation with the use of formula 8 corresponds to $d(\theta)^T E_N$ in formula 17 in MUSIC method. Therefore, to obtain the final spectrum, it is necessary to separately perform calculation with the use of the following formula 10. Such calculation processing is executed by the spectrum calculating means 206.

$$SPE(\Phi) = diag(rDFT^T E_N E_N^T rDFT) \quad (10)$$

$$= |rDFT^T E_N|^2$$

$$= |SPE_{tmp}(\Phi)|^2$$

Formula 10 is described differently from formula 17. However, the both formulas represent the same, except that formula 10 is a calculation method in the case that the spectrum over a whole range of directions is calculated by using matrix operation and a reciprocal transformation is not applied. $diag(\cdot)$ is a calculation to extract diagonal elements of a matrix "·." $|\cdot|^2$ is a calculation to obtain a norm of each line of the matrix "·." The spectrum obtained by the spectrum calculating means 206 is inputted to the spectrum peak detecting means 106. Then, the spectrum peak detecting means 106 detects a peak direction with the minimum value (or maximum value) of the spectrum. In the case of the MUSIC spectrum obtained with the use of formula 10, the direction with the minimum value in the spectrum corresponds to the (temporary) arrival direction.

It is possible to directly output the peak direction detected by the spectrum peak detecting means 106 as the final arrival direction. However, in that case, the estimation precision is determined based on the frequency (angle) division width. Therefore, to obtain an arrival direction estimated value with a higher degree of precision, interpolation processing is performed. This processing can be omitted if necessary. As shown in FIG. 4, the arrival direction calculating means 107 performs quadratic function approximation by using peak directions $\phi_M$ and $\phi_{M-1}$, $\phi_{M+1}$ as left and right directions adjacent to the peak direction $\phi_M$, and corresponding spectrum values y1=SPE($\phi_{M-1}$), y2=SPE($\phi_M$), and y3=SPE($\phi_{M+1}$) obtained with the use of formula 10. Then, the direction corresponding to the peak of the approximated quadratic function is regarded as the final arrival direction. The final arrival direction in this case is obtained with the use of the following formula 11. This processing is performed the same number of times as the number of peak directions. d is a spectrum division width (d=|$\phi_M-\phi_{M-1}$|=|$\phi_M-\phi_{M+1}$|).

$$X_{pk} = \phi_M + \frac{(y1-y3)d}{2(y1-2 \cdot y2 + y3)} \quad (11)$$

FIG. 5 shows the result of comparing this embodiment to the case without interpolation as regards the estimation error. As shown in FIG. 5, the line indicated by "WITH INTERPOLATION (EMBODIMENT OF INVENTION)" is the line in the case that formula 11 is applied to the spectrum obtained with the use of formula 10. It is evident that this line shows almost no error. The line indicated by "WITH INTERPOLATION (RELATED ART)" is the line in the case that formula 11 is applied to the result of calculating logarithm of the spectrum obtained with the use of the existing formula 17. As above, in the case of using MUSIC method based on null scanning or the like, the direction estimation precision is improved not by providing the quadratic function interpolation for the spectrum obtained with the use of formula 17 usually used, but providing the quadratic function interpolation for the denominator thereof. This is using a fact that $d(\theta)^T \cdot E_N$ in formula 17 is changed almost linearly in the vicinity of the actual arrival direction ($\theta$ in the case of $d(\theta)^T \cdot E_N=0$) (that is, $|d(\theta)^T \cdot E_N|^2$ as a square value thereof can be approximated with the use of a quadratic function).

Further, in the case of beam former method based on beam scanning, CAPON method and the like, it is possible to expect improvement of the estimation precision by applying interpolation with the use of formula 11 to usual spectrums (formula 18 or formula 19). As above, it becomes possible to attain high precision estimation by performing subsequent interpolation processing without setting short frequency (angle) division of the spectrum. Further, the description has been hereto given of the case in which the antenna elements are arranged symmetrically and unitary method can be used as an example. However, when the antenna elements are not arranged symmetrically and unitary method is not able to be used, FFT may be used. Furthermore, in the foregoing example, arrival direction estimation is performed with the use of spatially sampled signals obtained by the antenna array. However, the MUSIC method can be also applied to frequency sampled signals. In this case, it is possible to attain high resolution estimation of the delay time of the receiving wave.

Next, a description will be given of the arrival direction estimation flow in the arrival direction estimation apparatus according to the first embodiment of the invention with reference to FIG. 6. As shown in FIG. 6, first, the antenna 101 composed of the plurality of antenna elements 101-1 to 101-K receives signals (step S601). The complex digital signal obtaining means 102 composed of the plurality of signal obtaining means 102-1 to 102-K coverts the received signals to the complex digital signals (step S602). The real number correlation matrix calculating means 103 to which the converted complex digital signals are inputted performs correlation calculation among the plurality of antenna elements 101-1 to 101-K to calculate the real number correlation matrix (step S603). The real number weight matrix calculating means 104 to which the calculated real number correlation matrix is inputted generates the real number weight matrix necessary for spectrum calculation based on the real number correlation matrix (step S604).

The multiplying means 202 of the spectrum calculating means 105 to which the generated real number weight matrix is inputted multiplies the part of the elements of rDFT extracted from the real number matrix storing means 201 by the part of the elements of the real number weight matrix (step S605). Then, the multiplying means 202 stores the multiplication processing result in the result storing means 203 (step S606). Next, the calculating means 204 provides the processing result stored in the result storing means 203 with element inversion processing and sign change processing (step S607). Then, the adding means 205 adds the result processed by the calculating means 204, the processing result stored in the result storing means 203, and the value extracted from the elements of the real number weight matrix to each other (step S608). After that, the spectrum calculating means 206 calculates the spectrum based on the addition result (step S609).

The spectrum peak detecting means 106 to which the calculated spectrum is inputted detects the peak direction with the minimum value (or maximum value) of the spectrum (step S610). The arrival direction calculating means 107 to which the detected peak direction is inputted performs quadratic function approximation of the spectrum based on the detected peak direction, and estimates the arrival direction of the electric wave (signal) (step S611).

Second Embodiment

Figure 7:
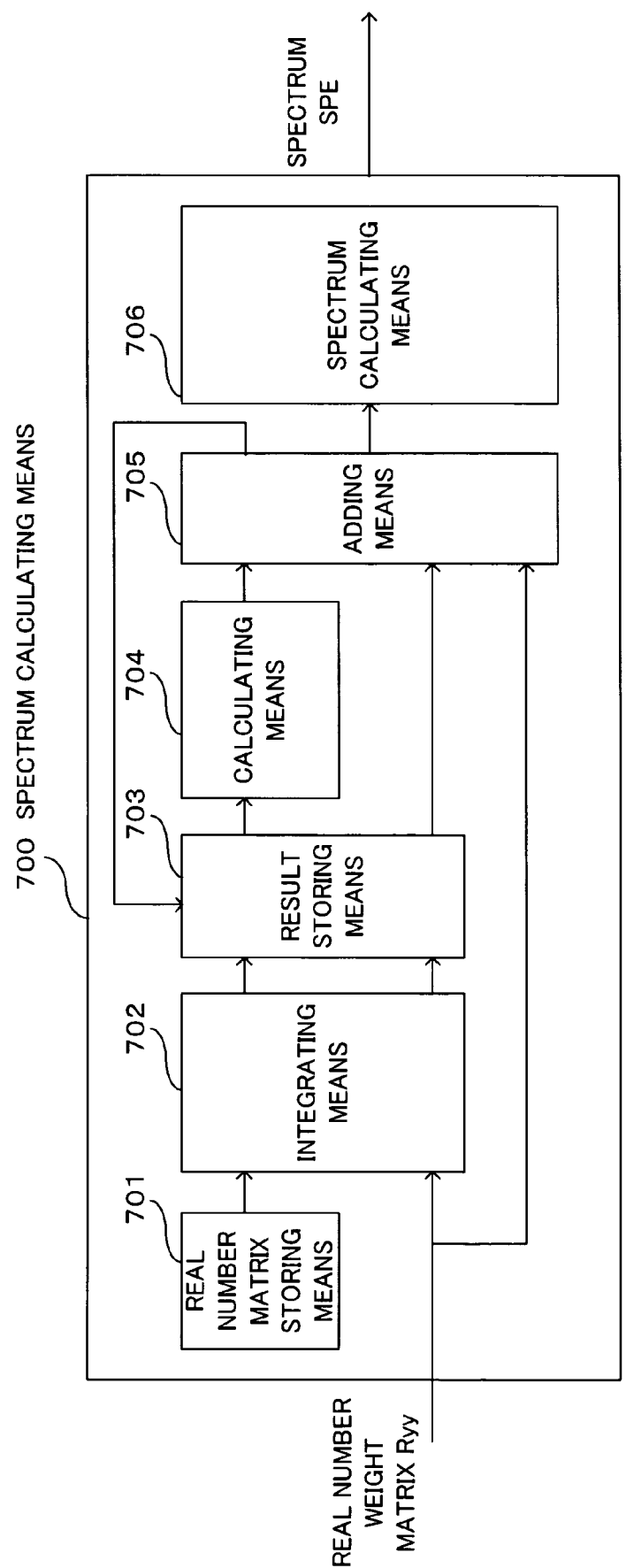
FIG. 7 is a structural diagram showing a structure of a spectrum calculating means of an arrival direction estimation apparatus according to a second embodiment of the invention.
Figure 8:
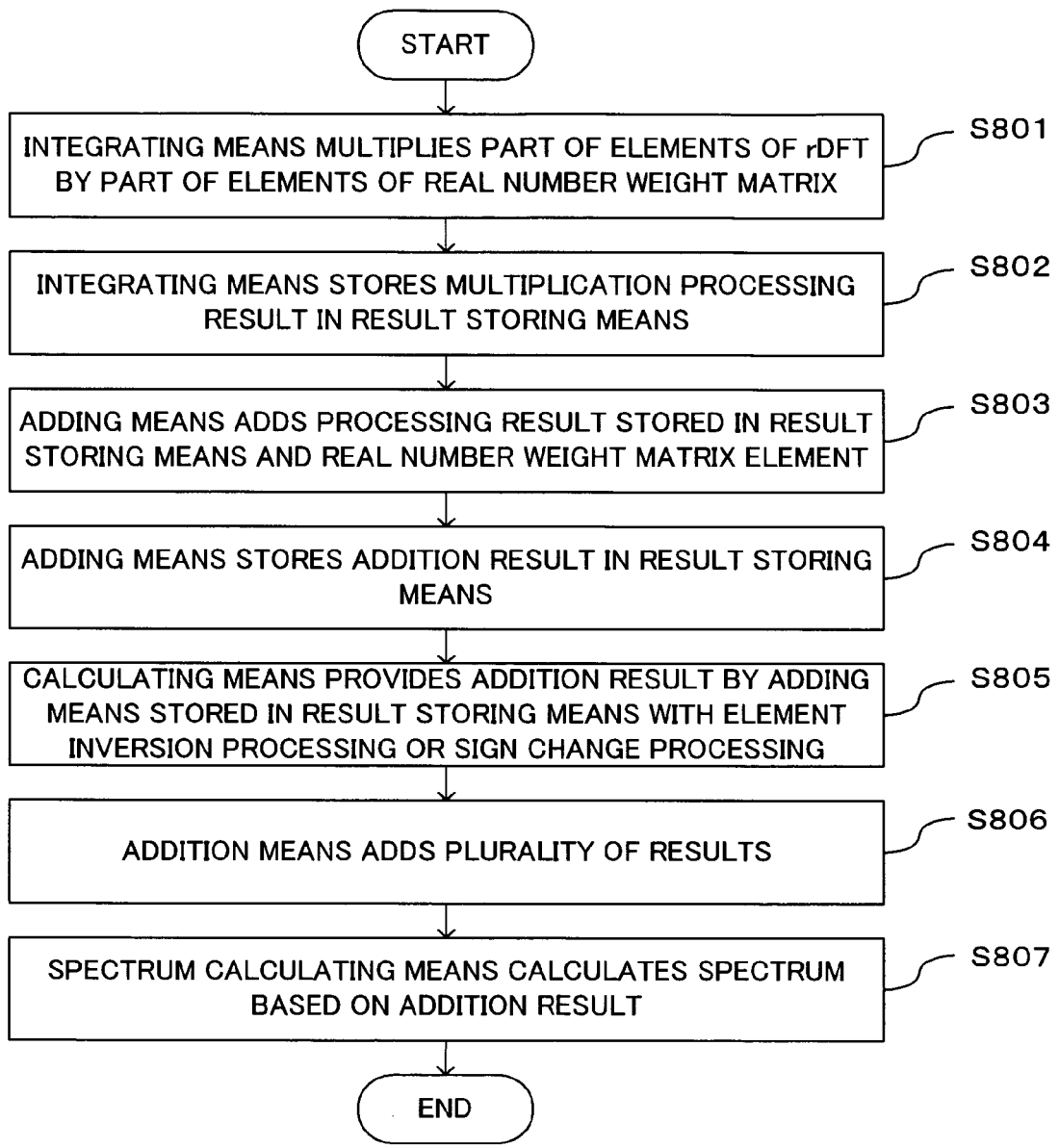
FIG. 8 is a flowchart for explaining a processing flow of inside of the spectrum calculating means of the arrival direction estimation apparatus according to the second embodiment of the invention.

Next, a description will be given of an arrival direction estimation apparatus according to a second embodiment of the invention with reference to FIG. 7 and FIG. 8. The processing of the arrival direction estimation apparatus according to the second embodiment is similar to the processing of the arrival direction estimation apparatus according to the first embodiment, except for the processing of the spectrum calculating means of the arrival direction estimation apparatus according to the second embodiment. FIG. 7 shows a structure of the spectrum calculating means of the arrival direction estimation apparatus according to the second embodiment. In the spectrum calculating means 105 of the arrival direction estimation apparatus according to the first embodiment, the results of A*$w_1$ and B*$w_3$ are reused to reduce the multiplication calculation amount. Meanwhile, in a spectrum calculating means 700 of the arrival direction estimation apparatus according to the second embodiment, A*$w_1$+C*$w_2$ and A*$w_1$−C*$w_2$ are further calculated (not necessary to calculate C*$w_2$) the results thereof are used, and thereby the number of addition calculation can be reduced more than in the first embodiment. $SPE_{tmp}$ then is shown in the following formula 12.

$$SPE_{tmp}(\Phi) = \begin{bmatrix} -(Aw_1 - Cw_2) - Bw_3 \\ U(Aw_1 + Cw_2) - U(Bw_3) \\ (Aw_1 + Cw_2) + Bw_3 \\ -U(Aw_1 - Cw_2) + U(Bw_3) \end{bmatrix} \quad (12)$$

$$= \begin{bmatrix} s_1 \\ s_2 \\ s_3 \\ s_4 \end{bmatrix}$$

$$Aw_1 + Cw_2 = \sqrt{2} \begin{bmatrix} w_1 \cdot \cos\left(\frac{\pi}{16}\right) + w_2 \\ w_1 \cdot \cos\left(\frac{3\pi}{16}\right) + w_2 \\ w_1 \cdot \cos\left(\frac{5\pi}{16}\right) + w_2 \\ w_1 \cdot \cos\left(\frac{7\pi}{16}\right) + w_2 \end{bmatrix}$$

$$Aw_1 - Cw_2 = \sqrt{2} \begin{bmatrix} w_1 \cdot \cos\left(\frac{\pi}{16}\right) - w_2 \\ w_1 \cdot \cos\left(\frac{3\pi}{16}\right) - w_2 \\ w_1 \cdot \cos\left(\frac{5\pi}{16}\right) - w_2 \\ w_1 \cdot \cos\left(\frac{7\pi}{16}\right) - w_2 \end{bmatrix}$$

$$Bw_3 = -\sqrt{2} \begin{bmatrix} w_3 \cdot \sin\left(\frac{\pi}{16}\right) \\ w_3 \cdot \sin\left(\frac{3\pi}{16}\right) \\ w_3 \cdot \sin\left(\frac{5\pi}{16}\right) \\ w_3 \cdot \sin\left(\frac{7\pi}{16}\right) \end{bmatrix}$$

A description will be given of a processing flow of the inside of the spectrum calculating means of the arrival direction estimation apparatus according to the second embodiment with reference to FIG. 8. First, a multiplying means 702 multiplies part of the elements of rDFT extracted from the real number matrix storing means 701 by part of the elements of the real number weight matrix (step S801). Then, the multiplying means 702 stores the multiplication processing results in a result storing means 703 (step S802). Next, an adding means 705 adds the processing result stored in the result storing means 703 and an element of the real number weight matrix (step S803). The adding means 705 stores the addition result in the result storing means 703 (step S804). Then, a calculating means 704 provides the addition result by the adding means 705 which is stored in the result storing means 703 with element inversion processing and sign change processing (step S805).

Next, the adding means 705 adds the processing result of the element inversion processing and the sign change processing provided by the calculating means 704 in step S805, the processing result of element inversion processing and sign change processing provided by the calculating means 704 for part of the processing results stored in the result storing means 703 in step S802, part of the processing results stored in the result storing means 703 in step S802, and the addition result added by the adding means 705 in step S803 (step S806). Then, the spectrum calculating means 706 calculates the spectrum based on the addition result (step S807). The processing subsequent herefrom is similar to that of the first embodiment, and thus the description thereof will be omitted. When the value of K (the number of elements) becomes large, the coefficient values of each line of rDFT become more periodical. In this case, by using the symmetry and the periodicity of the coefficient values of each line of rDFT, it is possible to further reduce the calculation amount.

Third Embodiment

Figure 9:
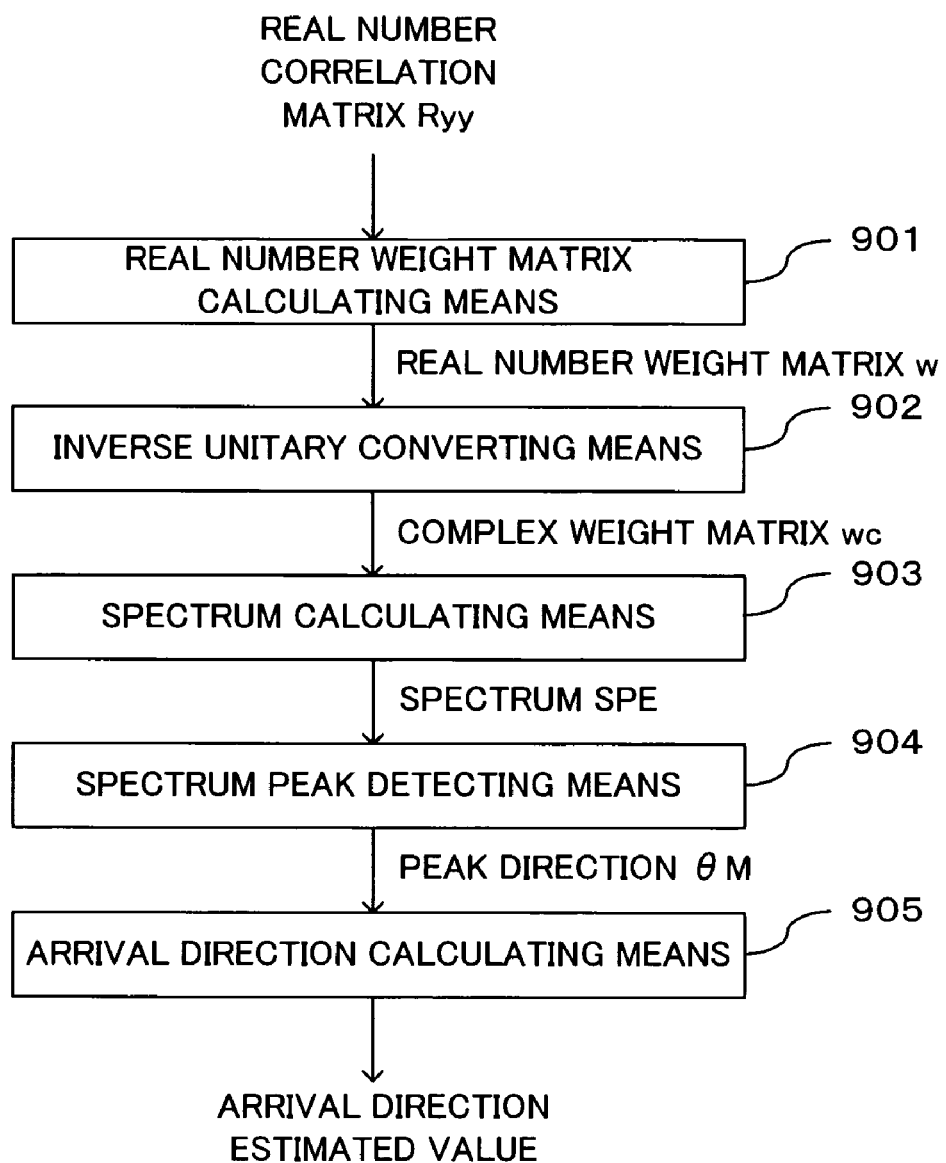
FIG. 9 is a diagram showing part of a structure of an arrival direction estimation apparatus according to a third embodiment of the invention.

Next, a description will be given of an arrival direction estimation apparatus according to a third embodiment of the invention with reference to FIG. 9. FIG. 9 shows part of a structure of the arrival direction estimation apparatus according to the third embodiment of the invention. FIG. 9 does not show components corresponding to the antenna 101, the complex digital signal obtaining means 102, and the real number correlation matrix calculating means 103 of the first embodiment. However, means corresponding thereto are components of the arrival direction estimation apparatus according to the third embodiment of the invention. In the third embodiment of the invention, the real number weight matrix obtained by the real number weight matrix calculating means 104 of the first embodiment is once returned to the complex weight matrix by providing inverse unitary conversion, and the spectrum is calculated by using FFT.

The arrival direction estimation apparatus according to the third embodiment of the invention includes a real number weight matrix calculating means 901, an inverse unitary converting means 902, a spectrum calculating means 903, a spectrum peak detecting means 904, and an arrival direction calculating means 905, in addition to the components corresponding to the antenna 101, the complex digital signal obtaining means 102, and the real number correlation matrix calculating means 103 in the first embodiment. As in the first embodiment, the real number weight matrix calculating means 901 generates the real number weight matrix w. The inverse unitary converting means 902 provides the generated real number weight matrix w with inverse unitary conversion to generate a complex weight matrix wc. The spectrum calculating means 903 calculates the spectrum by using FFT for the generated complex weight matrix wc. The method to calculate the spectrum by using FFT is well known in the art, and thus the description thereof will be omitted. After the spectrum calculation, as in the first embodiment, the spectrum peak detecting means 904 detects the peak direction, and the arrival direction calculating means 905 performs direction estimation by using quadratic function approximation. Thereby, it becomes possible to perform precise direction estimation.

Fourth Embodiment

Figure 10:
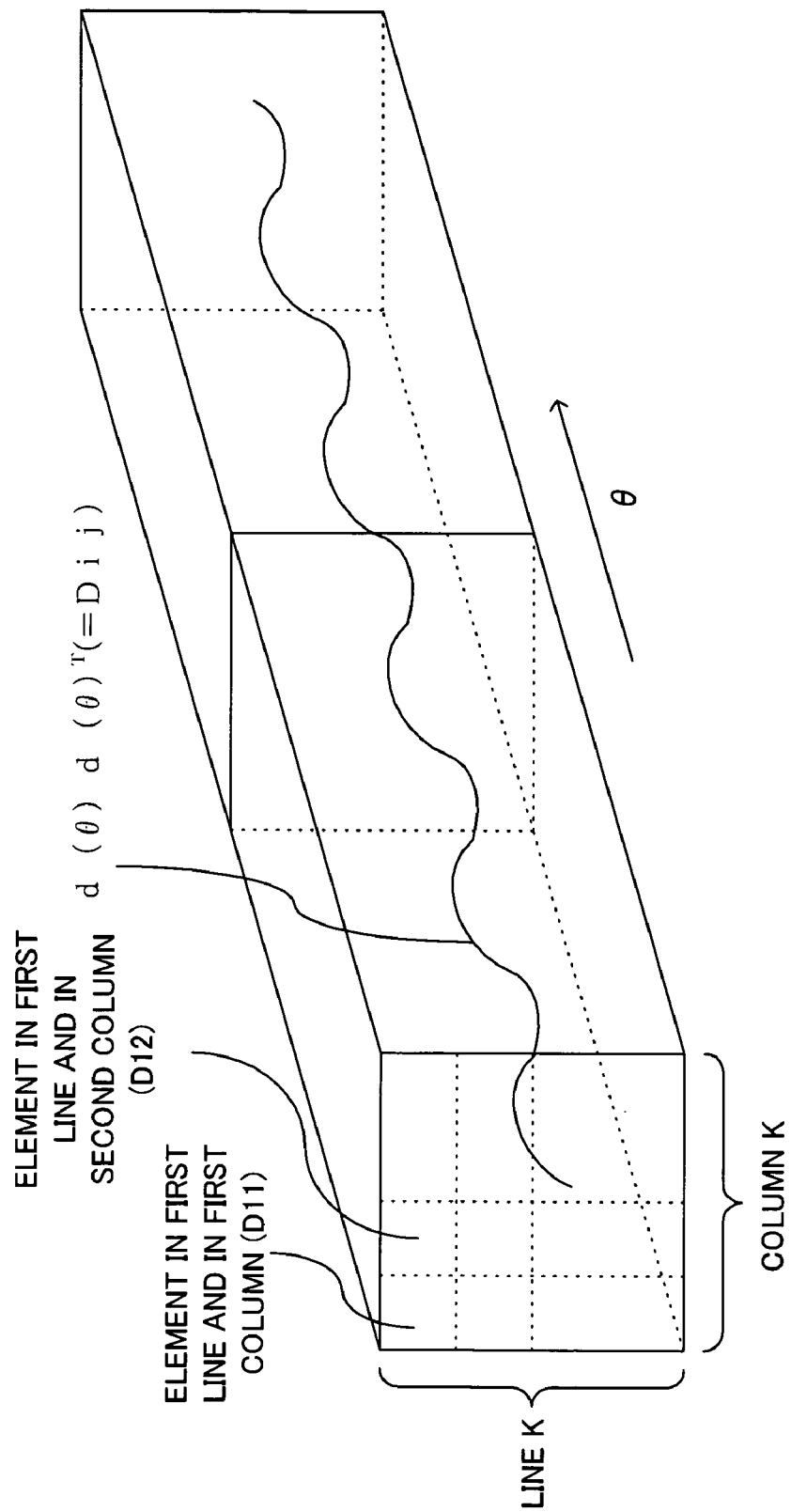
FIG. 10 is a diagram for explaining periodicity of each element of $d(\theta)d(\theta)^T$ in an arrival direction estimation apparatus according to a fourth embodiment of the invention.
Figure 11A:
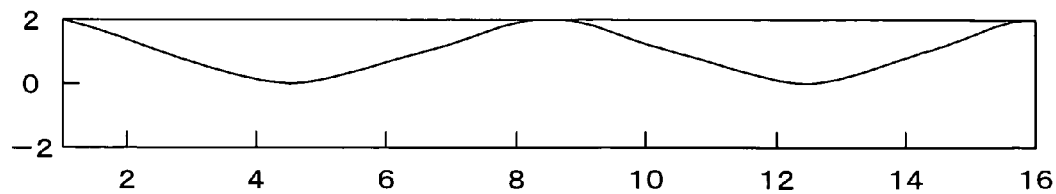
FIG. 11A is a diagram which graphs out coefficient values of each element of $d(\theta)d(\theta)^T$ in the arrival direction estimation apparatus according to the fourth embodiment of the invention.
Figure 11A:
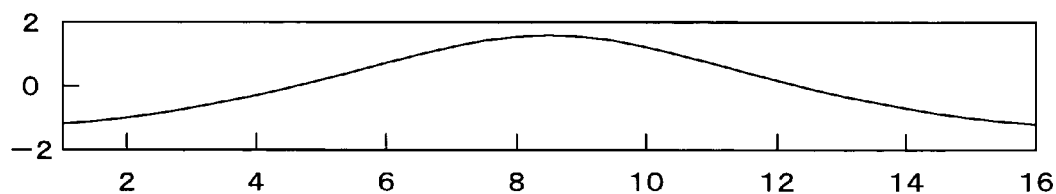
Figure 11A:
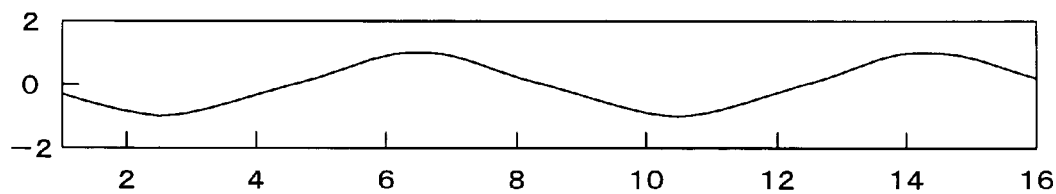
Figure 11A:
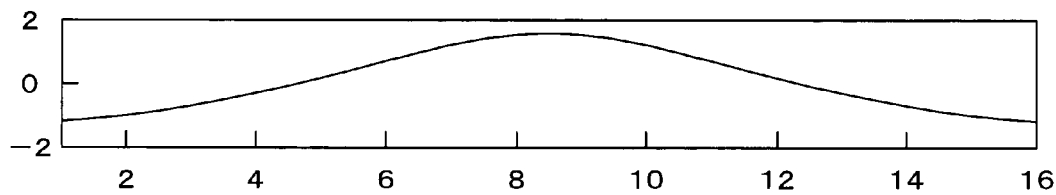
Figure 11A:
Figure 11A:
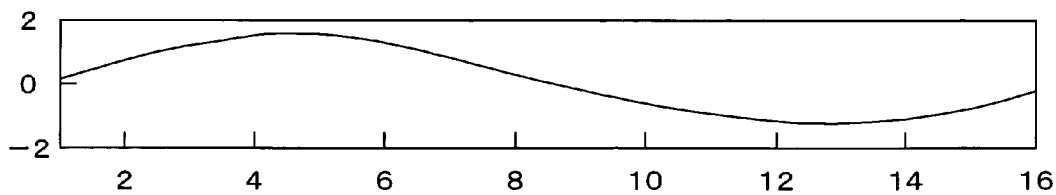
Figure 11B:
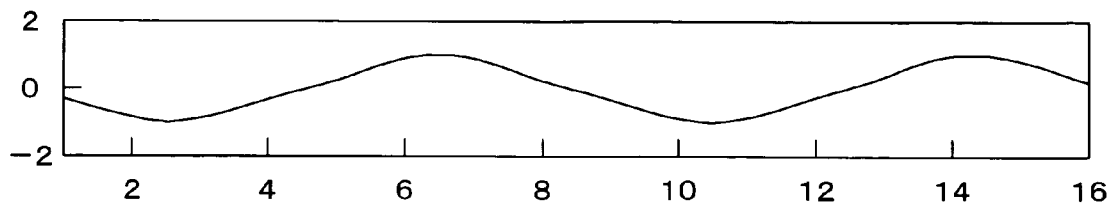
FIG. 11B is a diagram which graphs out coefficient values of each element of $d(\theta)d(\theta)^T$ in the arrival direction estimation apparatus according to the fourth embodiment of the invention.
Figure 11B:
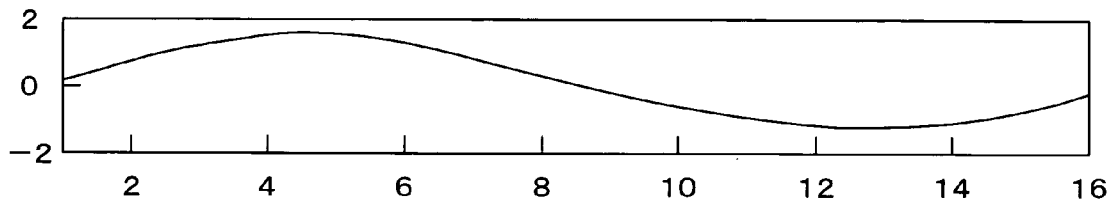
Figure 11B:
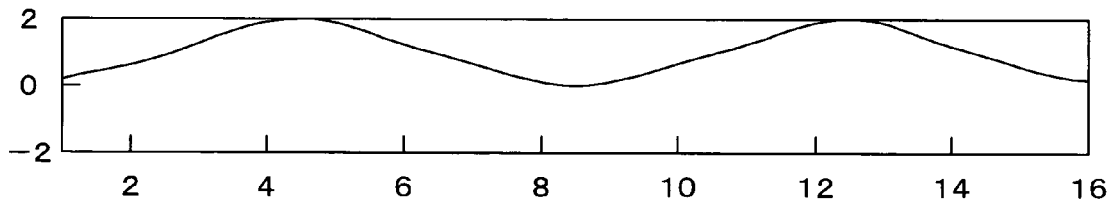
Figure 12:
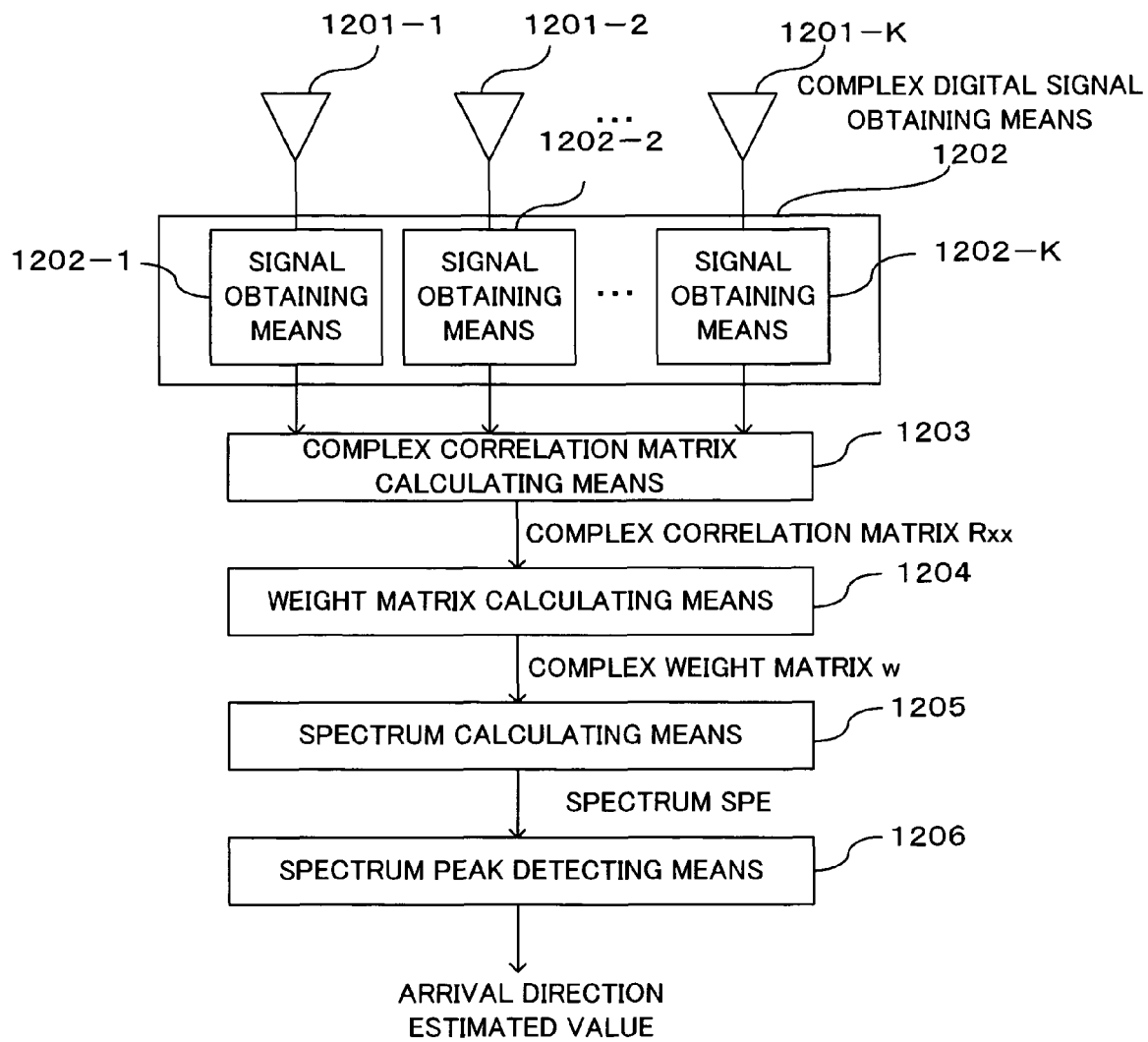
FIG. 12 is a structural diagram showing a structure of an existing arrival direction estimation apparatus.

Next, a description will be given of an arrival direction estimation apparatus according to a fourth embodiment of the invention with reference to FIGS. 10 to 11B. The following description will be given of a case using unitary CAPON method as an example. In the case of unitary CAPON method, the spectrum is expressed as shown in formula 19. It is possible to calculate $d(\theta)^T R_{yy}^{-1}$ by using the calculation method described in the first embodiment. Otherwise, in the forth embodiment, the calculation amount is reduced by the following calculation. The denominator of formula 19 can be deformed as shown in the following formula 13.

$$d(\theta)^T R_{yy}^{-1} d(\theta) = \text{Sum}(d(\theta)d(\theta)^T \otimes R_{yy}^{-1}) \quad (13)$$

where $\otimes$ is Hadamard product.

Sum ($\cdot$) is a calculation to express the sum of all elements of a matrix "$\cdot$," and can be defined by formula 14. The Hadamard product is a calculation symbol of multiplication of corresponding matrix elements, and can be defined by the following formula 15.

$$\text{Sum}(R) = \sum_i \sum_j r_{ij} \quad (14)$$

where $r_{ij}$ is an element in line $i$ and in column $j$ of a matrix $R$.

$$A = \begin{bmatrix} a_{11} & a_{12} & \cdots & a_{1M} \\ a_{21} & a_{22} & \cdots & a_{2M} \\ \vdots & \vdots & \ddots & \vdots \\ a_{N1} & a_{N2} & \cdots & a_{NM} \end{bmatrix} \quad (15)$$

$$B = \begin{bmatrix} b_{11} & b_{12} & \cdots & b_{1M} \\ b_{21} & b_{22} & \cdots & b_{2M} \\ \vdots & \vdots & \ddots & \vdots \\ b_{N1} & b_{N2} & \cdots & b_{NM} \end{bmatrix}$$

where $$A \otimes B = \begin{bmatrix} a_{11}b_{11} & a_{12}b_{12} & \cdots & a_{1M}b_{1M} \\ a_{21}b_{21} & a_{22}b_{22} & \cdots & a_{2M}b_{2M} \\ \vdots & \vdots & \ddots & \vdots \\ a_{N1}b_{N1} & a_{N2}b_{N2} & \cdots & a_{NM}b_{NM} \end{bmatrix}$$

d(74)d($\theta$)$^T$ is a real number matrix of K*K. In this case, each element of the matrix d($\theta$)d($\theta$)$^T$ (=Dij) has periodicity along the direction in which $\theta$ is changed as shown in FIG. 10. Therefore, the calculation amount can be reduced by using the periodicity. Here, Dij means an element in line i and in column j of a matrix D. D11 means an element in the first line and in the first column of the matrix D. Coefficients of each element of d($\theta$)d($\theta$)$^T$ in the case of using an element as d($\theta$) similar to that of the first embodiment are shown in FIG. 11A and FIG. 11B. FIG. 11A and FIG. 11B show the case where K is 3. As evidenced by FIG. 11A and FIG. 11B, the coefficients of each element of d($\theta$)d ($\theta$)$^T$ have periodicity, and thus it is possible to reduce the calculation amount and calculate the spectrum with the use of formula 13.

INDUSTRIAL APPLICABILITY

According to the arrival direction estimation apparatus of the embodiments of the invention, the calculation amount in spectrum calculation can be greatly reduced, and precise direction estimation can be made without setting short frequency division in spectrum calculation. Therefore, the invention is useful for, for example, the arrival direction estimation apparatus for estimating an arrival direction of electric waves by using an antenna having a plurality of antenna elements.

What is claimed is:
1. An arrival direction estimation apparatus comprising:
an antenna in which a plurality of antenna elements are symmetrically arranged centering on a given reference position or a reference line and which receives signals by the plurality of antenna elements;
a complex digital signal converting means which converts the signals received by each antenna element of the antenna to complex digital signals;
a real number correlation matrix calculating means which calculates a real number correlation matrix expressing correlation among the plurality of antenna elements of the complex digital signals;
a real number weight matrix calculating means which calculates a real number weight matrix used for calculating a spectrum based on the calculated real number correlation matrix;
a spectrum calculating means which calculates the spectrum based on the calculated real number weight matrix and a previously prepared real number matrix used for calculating the spectrum; and
a spectrum peak detecting means which detects a direction with a peak value with the use of the calculated spectrum, wherein the spectrum calculating means includes
a real number matrix storing means which stores the real number matrix,
a multiplying means which multiplies part of elements of the real number matrix stored in the real number matrix storing means by part of elements of the real number weight matrix,
a result storing means which stores a processing result of multiplication by the multiplying means,
a calculating means which performs at least one or more processing of matrix element inversion processing and matrix element sign change processing for the processing result stored in the result storing means,
an adding means which adds a processing result by the calculating means, part of the processing result stored in the result storing means, and part of the elements of the real number weight matrix, and
a spectrum calculating means which calculates the spectrum with the use of a processing result by the adding means.

2. The arrival direction estimation apparatus according to claim 1 comprising:
an arrival direction calculating means which estimates an arrival direction of the signals based on spectrum results at the direction detected by the spectrum peak detecting means and peripheral directions thereof.

3. The arrival direction estimation apparatus according to claim 1 wherein the spectrum calculating means comprises:
the real number matrix storing means which stores the real number matrix;
the multiplying means which multiplies the part of the elements of the real number matrix stored in the real number matrix storing means by the part of the elements of the real number weight matrix;
the result storing means which stores the processing result of multiplication by the multiplying means;
the calculating means which performs at least one or more processing of the matrix element inversion processing and the matrix element sign change processing for the processing result stored in the result storing means;
the adding means which selectively adds elements from the group including the processing result by the calculating means, the part of the processing result stored in the result storing means, and the part of the elements of the real number weight matrix; and
the spectrum calculating means which calculates the spectrum with the use of the processing result by the adding means, and wherein
the adding means stores a given processing result by itself in the result storing means.

4. The arrival direction estimation apparatus according to claim 1, wherein the real number matrix storing means stores only the part of the elements of the real number matrix.

5. The arrival direction estimation apparatus according to claim 1, wherein the spectrum calculating means calculates the spectrum by using a multiplication result of elements of the vectors indicating directivity of the antenna.

6. An arrival direction estimation apparatus comprising:
an antenna in which a plurality of antenna elements are arranged and which receives signals by the plurality of antenna elements;
a complex digital signal converting means which converts the signals received by each antenna element of the antenna to complex digital signals;
a correlation matrix calculating means which calculates a correlation matrix expressing correlation among the plurality of antenna elements of the complex digital signals;
a weight matrix calculating means which calculates a weight matrix used for calculating a spectrum based on the calculated correlation matrix;
a spectrum calculating means which calculates the spectrum based on the calculated weight matrix and a vector indicating directivity of the antenna;
a spectrum peak detecting means which detects a direction with a peak value with the use of the calculated spectrum result; and
an arrival direction calculating means which estimates an arrival direction of the signals based on spectrum results in the direction detected by the spectrum peak detecting means and peripheral directions thereof.

7. The arrival direction estimation apparatus according to claim 6, wherein the spectrum calculating means calculates the spectrum by using a multiplication result of elements of the vectors indicating directivity of the antenna.

8. An arrival direction estimation apparatus comprising:
an antenna in which a plurality of antenna elements are symmetrically arranged centering on a given reference position or a reference line and which receives signals by the plurality of antenna elements;
a complex digital signal converting means which converts the signals received by each antenna element of the antenna to complex digital signals;
a real number correlation matrix calculating means which calculates a real number correlation matrix expressing correlation among the plurality of antenna elements of the complex digital signals;
a real number weight matrix calculating means which calculates a real number weight matrix used for calculating a spectrum based on the calculated real number correlation matrix;
an inverse unitary converting means which provides the calculated real number weight matrix with inverse unitary conversion to calculate a complex weight matrix;
a spectrum calculating means which provides the calculated complex weight matrix with Fast Fourier Transform to calculate the spectrum;
a spectrum peak detecting means which detects a direction with a peak value with the use of the calculated spectrum result; and
an arrival direction calculating means which estimates an arrival direction of the signals based on spectrum results at the direction detected by the spectrum peak detecting means and peripheral directions thereof.

* * * * *